United States Patent [19]

Demarey

[11] Patent Number: 5,149,756

[45] Date of Patent: * Sep. 22, 1992

[54] HYBRID AMINO RESIN COMPOSITIONS

[75] Inventor: David W. Demarey, Westhampton, Mass.

[73] Assignee: Monsanto Company, St. Louis, Mo.

[*] Notice: The portion of the term of this patent subsequent to Aug. 13, 2008 has been disclaimed.

[21] Appl. No.: 301,191

[22] Filed: Jan. 24, 1989

[51] Int. Cl.$^5$ .................. C08F 283/00; C08G 8/28; C08L 61/00; C08L 61/20

[52] U.S. Cl. ........................ 528/230; 525/34; 525/162; 525/549; 525/518; 525/519

[58] Field of Search ............. 525/509, 518, 519, 162, 525/30; 528/230

[56] References Cited

U.S. PATENT DOCUMENTS

| | | | |
|---|---|---|---|
| Re. 29,504 | 1/1977 | Dawans et al. | 526/335 |
| 3,020,255 | 2/1962 | Magiane et al. | 525/518 |
| 3,333,021 | 7/1967 | Geipert | 525/23 |
| 3,544,489 | 12/1970 | Dowbenko et al. | 260/2.5 |
| 3,899,611 | 8/1975 | Hall | 525/420 |
| 3,931,265 | 1/1976 | Sias | 556/69 |
| 3,979,478 | 9/1976 | Gallacher | 260/850 |
| 4,049,634 | 9/1977 | Keium Ko et al. | 260/75 |
| 4,337,296 | 6/1982 | Varadhachary | 522/95 |
| 4,381,813 | 5/1983 | Kottke | 523/146 |
| 4,409,077 | 10/1983 | Sakiyama et al. | 525/519 |
| 4,520,184 | 5/1985 | Van Eenam | 526/320 |
| 4,652,718 | 3/1972 | Abrahami et al. | 525/23 |
| 4,839,427 | 6/1989 | Mormile | 525/162 |

FOREIGN PATENT DOCUMENTS

| 2030992 | 9/1979 | United Kingdom . |
|---|---|---|
| 2097409 | 4/1982 | United Kingdom . |

OTHER PUBLICATIONS

Chem. Abstract 105:103521m Satoshi Inorg. Chem. 1986 25(18), 3209-11 (Eng.).

Advanced Inorganic Chemistry Cotton pp. 348-349 1988.

Chem. Abstract 104: 70677r Eur. Pat. Appl. Ep 153692 Kenji 1985.

*Primary Examiner*—James J. Seidleck
*Assistant Examiner*—W. R. H. Clark
*Attorney, Agent, or Firm*—R. Bruce Blance; William J. Farrington; R. H. Shear

[57] ABSTRACT

Hybrid curable compositions comprising components curable by condensation, and components curable by free-radical initiated polymerization, cure being catalyzed by a metal sulfonate. The components curable by condensation comprise amino resins and co-reactants. The components curable by free-radical initiated polymerization comprise acryloyl compounds.

20 Claims, No Drawings

HYBRID AMINO RESIN COMPOSITIONS

This invention relates to hybrid curable or thermosettable compositions and more particularly it relates to curable compositions comprising amino resins, co-reactants for such resins, (meth)-acryloyl unsaturated compounds and metal sulfonates and to the cured products obtained therefrom.

Curable compositions comprising amino resins and functional co-reactants have been used for many years in a variety of bonding and coating applications. In recent years high solids systems have been developed to avoid excessive solvent emissions upon application of the curable compositions to appropriate substrates. However the viscosity of the amino resin co-reactant mixture has generally limited the solids content to not more than 70 weight percent. Upon removal of solvent and curing of the compositions, coatings are obtained which possess high gloss and satisfactory QUV resistance and condensing humidity resistance. However, they are susceptible to "environmental etch" or discoloration caused by acidic organic depositions upon the surface. Curable compositions comprising (meth)-acryloyl unsaturated compounds are used extensively in radiation curable systems for surface coatings and in anaerobic systems for bonding applications. Such compositions, when they are used as surface coatings, can provide a high degree of hardness, gloss and resistance to environmental etch. However, because the amino resin/functional co-reactant is cured by an ionic mechanism, while the (meth)-acryloyl component is cured by a free radical mechanism, the two curable systems have generally been regarded as incompatible.

The present invention is directed to a hybrid of these two curable systems to obtain the advantage of higher solids content in comparison with the amino resin/functional co-reactant system. Surprisingly, the cure of the acryloyl component is not inhibited by the presence of the amino resin system and the cured hybrid coating possesses a high degree of gloss, distinctness of image and resistance to environmental effects. Furthermore the inclusion of metal sulfonate as the curing catalyst for the hybrid system provides a curable composition which possesses "one package" stability, as demonstrated by the property of stable viscosity after three weeks of storage.

The present invention is a curable composition comprising an alkoxymethyl amino resin component, a functional component co-reactive with the alkoxymethyl amino resin, a (meth)-acryloyl component and a metal sulfonate. Another aspect of the invention is directed to the cured compositions obtained from the curable compositions. The alkoxymethyl amino resin is selected from any of the class of those amino resins conventionally used for crosslinking functional co-reactants in which the functional groups are hydroxy, carboxy, activated methylene and the like. The (meth)-acryloyl component may be a (meth)-acryloyl monomer but more preferably it is an oligomer containing at least two (meth)-acryloyl groups per molecule. The hybrid system is cured by the application of heat, the cure being catalyzed by the heat-activated metal sulfonate. Optionally the rate of cure of the amino resin and the functional component can be enhanced with a blocked sulfonic acid and the polymerization of the (meth)-acryloyl component can be enhanced with a free-radical generating compound. Optionally for enhanced compatibility of the components of the curable composition, components with dual functionality may be included in the curable composition. For example components containing functional groups co-reactive with the alkoxymethyl groups of the amino resin and (meth)-acryloyl groups may be included and similarly groups comprising alkoxymethylamino groups and (meth)-acryloyl groups may be included. While a broad compositional range is contemplated in the formulation of the curable composition of the present invention, it is limited by the requirement that the components provide a compatible system as hereinafter defined.

THE AMINO RESIN

As used in this description the term "alkoxymethyl amino resin" refers to any of the large number of alkoxylated amino resins which are commonly employed for crosslinking functional resins such as hydroxy functional resins. Such amino resins are characterized as being soluble in common solvents as distinguished from amino resins of the thermosetting type which are employed in molding or casting compositions. Amino resins which are suitable for the purpose of this invention are the alkoxymethyl urea derivatives of for example urea, ethylene urea, and glycouril and the alkoxymethyl polyamino triazines selected from the group consisting of melamine, acetoguanamine, adipoguanamine, and benzoguanamine and the like.

The alkoxymethylureas can be prepared in the conventional manner by reaction of the urea compound and formaldehyde under alkaline conditions followed by etherification with a $C_1$ to $C_8$ alcohol or mixture of such alcohols under acid conditions to provide a condensate with an average degree of condensation of about 5 or less and a urea compound: formaldehyde: alcohol ratio in the range of about 1:1.5:1.25 to 1:4:4 provided that on average there are at least about 1.8 alkoxymethyl groups per molecule. Preferably the ratio is in the range of about 1:1.8:1.5 to 1:3.5:3.5.

The alkoxymethylaminotriazines are methylolated polyaminotriazines substantially etherified with an alcohol or mixture of alcohols. They can be prepared by reaction of the polyaminotriazine with formaldehyde to methylolate at least about half of the amino groups and are then alkylated or etherified by reaction with the alcohol. The etherified methylolated aminotriazines are liquid and are essentially monomeric or at most are oligomeric with an average degree of polymerization of no more than about 5; the aminotriazine rings being joined by methylene or methylene ether bridges formed by condensation of two methylol groups. Suitable etherified aminotriazines include those possessing a ratio of aminotriazine to combined formaldehyde in the range of about $1:(2n-3)$ to about $1:2n$ where n is the number of amino groups per triazine ring and a ratio of aminotriazine to alkyl ether groups in the range of about $1:(2n-3.5)$ to about $1:2n$ provided that on average there are at least about 1.8 alkoxymethyl groups per molecule. A preferred aminotriazine is melamine which is potentially hexafunctional. Thus, the more preferred aminotriazine compounds are the alkoxymethyl melamines in which the ratio of melamine to combined formaldehyde is in the range of 1:3 to 1:6 and the ratio of melamine to alkoxy groups is in the range of 1:2.5 to 1:6. The alcohols suitable for etherification of the methylol melamine are branched or straight chains $C_1$ to $C_8$ alcohols. A mixture of alcohols such as methanol and butanol or methanol and isobutyl alcohol (2-methyl-1- propanol) can be used for the etherification to make a mixed etherified amino resin. Preferred mixed ethers are methoxy/butoxy and methoxy/isobutoxy ethers. The range of the ratio of methoxy/butoxy or methoxy/isobutoxy can vary widely. A preferred range is from about 2:1 to about 1:2. A single alcohol can also be used for etherification. For such an application, the preferred alcohol is methanol.

THE FUNCTIONAL CO-REACTANT

The functional co-reactant which is used with the present invention can be one of a number of reactants which contain functional groups capable of reaction with the alkoxymethyl or methylol groups of the alkoxymethyl amino resin provided that such functional groups do not inhibit the free radical cure of the unsaturated components of the composition of the present invention. Such functional groups include hydroxy, carboxy, amide and activated methylene groups. Such functional co-reactants are of number average molecular weight in the range of about 60 to about 8000 and their functionality expressed as the number of functional groups per average molecule is in the range of about 2 to about 10. Advantageously, the functional co-reactants are resins of number average molecular weight in the range of about 300 to about 4000 selected from the group consisting of acrylic resins, alkyd resins and polyester resins.

FUNCTIONAL ACRYLIC RESINS

The acrylic resins are polymers of at least one ester of an alpha-olefinic monocarboxylic acid having the general formula:

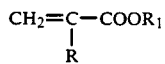

wherein R is either hydrogen or a lower alkyl group of from 1 to 4 carbon atoms, and $R_1$ represents an alkyl, hydroxy alkyl or cycloalkyl group of from 1 to 18 carbon atoms, and may include one or more of the comonomers of the formula:

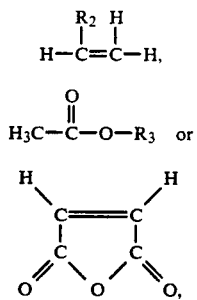

wherein $R_2$ is H, $CH_3$ or $C_6H_5$; and $R_3$ is alkene of 2 or 3 carbon atoms.

Examples of esters of alpha-olefinic monocarboxylic acids which may be used in the present invention include methyl acrylate, ethyl acrylate, propyl acrylate, isopropyl acrylate, butyl acrylate, hexyl acrylate, octyl acrylate, 2-ethylhexyl acrylate, cyclohexyl acrylate, decyl acrylate, stearyl acrylate, methyl methacrylate, methyl alpha-ethyl acrylate, ethyl methacrylate, butyl methacrylate, butyl alphaethyl acrylate, hydroxyethyl acrylate, hydroxyethyl methacrylate, hydroxypropyl methacrylate, hydroxypropyl acrylate, and lauryl methacrylate.

Examples of the comonomers which may be used in the acrylics of the present invention are phenyl allyl alcohol, glycidyl methacrylate, styrene, α-methyl styrene, acrylic acid, methacrylic acid, acrylonitrile, maleic anhydride, allyl acetate and vinyl acetate.

When the functional acrylic resin is a hydroxy functional resin the hydroxy groups may be provided by comonomer units supplied by hydroxy functional monomers such as hydroxyalkyl (meth)acrylates, allyl alcohol and methallyl alcohol. When the functional groups are acid groups, they may be supplied by copolymerizing with acrylic acid, methacrylic acid, maleic acid, fumaric acid and the like. When the functional groups are activated methylene groups, they may be supplied by means of an acetoacetyl functional monomer such as acetoacetoxyethyl (meth)-acrylate or a malonic acid diester such as vinyl ethyl malonate.

FUNCTIONAL ALKYD RESINS

The alkyd resins which can be used with the crosslinking composition of this invention include those types normally used in baking or air drying applications. These resins can contain up to about 45 weight percent of an oil or fatty acid. However, alkyd resins can be prepared which contain no fatty compound and are based upon polyols and polyacids only. These alkyd resins or oil-less alkyds are especially useful for exterior applications and provide a high degree of flexibility, adhesion, and elongation properties to the cured compositions of the present invention. Preferably, though, the fatty compound should be present in an amount equal to about 20 to about 45 weight percent of the total alkyd resin solids with the most preferable range being about 35 to 45 weight percent.

When a fatty compound is present in the alkyd resins of this invention, it can comprise any of the fatty acids or oils ordinarily used in preparing alkyd resins. Included are the following oils and their respectively derived fatty acids: tall, safflower, tung, tallow, soya, corn, linseed, poppyseed, castor, dehydrated castor, perilla, coconut, oiticica, and the like. Of special usefulness are those fatty compounds wherein the fatty acid portion contains from 12 to 24 carbon atoms per molecule.

An additional component of the alkyd resins of this invention is a polyol or a mixture of polyols. Among the polyols which can be utilized are those normally used in producing alkyd resins including pentaerythritol, glycerine, trimethyolpropane, trimethyolethane and the various glycols such as neopentyl, ethylene and propylene glycols. Preferable among the above types of polyols are triols or mixtures containing a major amount of a triol and a minor amount of tetra-alcohol.

Typical of the carboxylic acids in addition to the aforementioned fatty acids incorporated into the alkyd resins are phthalic anhydride, isophthalic acid, adipic acid, azelaic acid, benzoic acid, etc. These acids can readily be replaced by any of the additional acids normally used in alkyd resin processing. The preferred system in addition to including the aforementioned preferred levels of a fatty compound contains an aromatic dibasic acid or a mixture of such aromatic acid with an aliphatic dibasic acid.

In preparation of hydroxy or carboxy functional alkyds a suitable excess of polyol or polyacid is selected to provide the desired average molecular weight and hydroxy or carboxy functionality. In preparation of active methylene containing alkyds, a suitable hydroxy functional alkyd may be reacted with diketene or transesterified with methyl or ethyl acetoacetate or with dimethyl or diethyl malonate.

FUNCTIONAL POLYESTER RESIN

The polyester which can be used as a component of the composition of this invention may be saturated, unsaturated or oil-modified such as those polyesters well known in the surface coating art. Polyesters are prepared by reacting a polyhydric alcohol (polyol) and a polybasic acid.

Such polyols include ethylene glycol, propylene glycol, butylene glycol, diethylene glycol, dipropylene glycol, triethylene glycol, neopentyl glycol, trimethylene glycol, polyethylene glycol, polypropylene glycol, 1,5-pentanediol, trimethylolethane, trimethylolpropane, glycerol, 1,2,6-hexanetriol, pentaerythritol, sorbitol, mannitol, methyl glycoside, 2,2-bis(hydroxyethyoxyphenyl) propane, 2,2-bis (beta-hydroxypropoxyphenyl) propane and the like. Mono-functional alcohols may also be employed to supplement the other polyols and to control the molecular weight. Useful alcohols include those having a hydrocarbon chain comprising from about 3 to about 18 carbon atoms.

The acid component of such polyesters may include unsaturated acids such as maleic acid, fumaric acid, itaconic acid, citraconic acid, glutaconic acid, mesaconic acid, and the like, and their corresponding anhydrides where such anhydrides exist. Other polycarboxylic acids which may be utilized in addition to the above-mentioned acids include saturated polycarboxylic acids such as succinic acid, glutaric acid, adipic acid, pimelic acid, suberic acid, azelaic acid, sebacic acid, and the like. Certain aromatic polycarboxylic acids and derivatives thereof may also be useful; for example, phthalic acid, tetrahydrophthalic acid, hexahydrophthalic acid, endomethylenetetrahydrophthalic anhydride, tetrachlorophthalic anhydride, hexachloro-endomethylene tetrahydrophthalic acid and the like. The term acid as used in this specification includes the corresponding anhydrides, where such anhydrides exist.

In many instances it is optional to include a fatty acid. These include saturated fatty acids such as decanoic, dodecanoic, tetradecanoic, hexadecanoic, octadecanoic, docosanoic, and the like. In addition, unsaturated fatty acids may be used such as 9-octadecenoic, 9,12-octadecadienoic, 9,12,15-octadecatrienoic, 9,11,13-octadecatrienoic, 4-keto-9,11,13-octadecatrienoic, 12-hydroxy-9-octadecenoic, 13-docosenoic, and the like.

In preparation of hydroxy or carboxy functional polyesters a suitable excess of polyol or polyacid is selected to provide the desired average molecular weight and hydroxy or carboxy functionality. In preparation of active methylene containing polyesters, a suitable hydroxy functional alkyd may be reacted with diketene or transesterified with methyl or ethyl acetoacetate or with dimethyl or diethyl malonate.

THE (METH)-ACRYLOYL COMPOSITION

The (meth)-acryloyl composition useful in the curable compositions of the present invention can be an unsaturated monomer or oligomer or mixture of monomers and oligomers. The nature of the compound is not critical so long as it is activated towards free radical polymerization via the double bonds when it is brought into reactive admixture with a free-radical initiator in a substantially oxygen free environment. Suitable (meth)-acryloyl compositions advantageously have a number average molecular weight less than about 4000 and contain from 1 to about 10 unsaturated groups per molecule. A particularly preferred group of (meth)acryloyl monomers is represented by the structure:

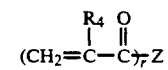

where $R_4$ is selected from the group consisting of H, $CH_3$ and $C_2H_5$, where r is an integer in the range of 1 to 10 and Z is a saturated or ethylenically unsaturated residue of an alcohol or polyol, a carboxylic acid or poly carboxylic acid, an amine or a polyamine, an epoxide or polyepoxide or an isocyanate or polyisocyanate or a methylol or polymethylol amino resin of a number average molecular weight less than about 4000 containing a hydrocarbon, ester, amide, ether urethane or amino resin backbone. Such monomers may be obtained by reaction of acryloyl or methacryloyl chloride with an alcohol, a polyol, an amine, or a polyamine or by the reaction of acrylic acid, methacrylic acid, acrylamide or methacrylamide with an epoxide, a polyepoxide, an isocyanate, or a polyisocyanate, or by reaction of a hydroxyalkyl acrylate or methacrylate with a carboxylic acid, polycarboxylic acid, an epoxide, a polyepoxide, an isocyanate, a polyisocyanate, a methylol amino resin, a polymethylol amino resin, a methoxymethyl amino resin or a polymethoxymethyl amino resin. Such (meth)-acryloyl compositions include methyl acrylate, methyl methacrylate, butyl acrylate, 1,3-butylene glycol diacrylate, 1,6-hexanediol diacrylate, the polyacrylates and polymethacrylates of polyethylene glycols and polyols, polypropylene glycols and polyols and poly(tetramethylene glycols) and poly(tetramethylene) polyols of molecular weight in the range of 100 to 4000, pentaerythritol tetracrylate, trimethylolpropane triacrylate, dipentaerythritol monohydroxypentacrylate, ethoxylated bisphenol A dimethacrylate, the diacrylates, dimethacrylates and diethacrylates of epoxy compounds formed from bisphenol A and epichlorohydrin of molecular weight in the range of 200 to 4000, the polyacryloyl monomers prepared by reacting isocyanate capped polyethers and isocyanate capped polyesters of molecular weight up to 4000 with hydroxyethyl (meth)acrylate, and the polyacryloyl monomers prepared by reacting (meth)-acrylic acid (meth)-acrylamide or hydroxyethyl (meth)-acrylate with polymethoxyalkyl amino resins such as hexamethoxymethyl melamine.

The Metal Sulfonate

The fourth component of the curable compositions of the present invention is a metal sulfonate of a transition metal. Suitable metal sulfonates include those of metals of groups IB, IIIB, IVB, VB, VIB, VIIB and VIII of the CAS Periodic Table set forth in Cotton and Wilkinson, "Advanced Inorganic Chemistry," 5th Edition, Wiley and Sons, N.Y., 1988. Preferred metals include vanadium, yttrium, manganese, cobalt, nickel, copper, and niobium. Mixed sulfonates of these metals may be used. The most preferred metals are manganese, niobium and vanadium. The metal sulfonates do not influence the cure of the compositions of the present invention at room temperature. Hence the compositions possess "one package" stability. However, when the compositions are subjected to temperatures of 80° C. and higher, cure of the compositions occurs readily. Preferred curing temperatures are in the range of 100° to 150° C. with temperatures in the range of 100° to 130° C. being most preferred.

The sulfonic acid used for the metal sulfonate is any sulfonic acid which can provide metal sulfonates of the transition metals listed hereinabove, soluble at catalytically effective concentrations in the curable composition. The term "catalytically effective" is used to mean that the metal sulfonate in a heat activated form is effective to catalyze the cure of the curable composition of the present invention at the selected reaction temperature. The concentration of metal sulfonate is advantageously in the range which provides from 0.05 to 3.0 meq of metal per 100 parts by weight of the reactive components of the curable composition and is preferably in the range which provides from 0.1 to 1.0 meq. Suitable sulfonic acids may be selected from the group consisting of methanesulfonic acid, hexanesulfonic acid, dodecanesulfonic acid, benzenesulfonic acid, toluenesulfonic acid, hexylbenzensulfonic acid, dodecylbenzenesulfonic acid, naphthalenesulfonic acid, naphthalene disulfonic acid, dodecylnaphthalenesulfonic acid, dinonylnaphthalenesulfonic acid and dinonylnaphthalene disulfonic acid. Preferred acids to ensure adequate solubility of the metal salt in the curable composition of the present invention contain large non-polar aliphatic groups such as hexyl, nonyl and dodecyl groups. Mixtures of the acids may be used and indeed an excess of disulfonic acid or some mono-sulfonic acid is advantageously used with disulfonic acid to avoid gelation when the metal salt is formed from such disulfonic acids.

The metal sulfonates may be prepared by adding sulfonic acid to a metal oxide, a metal alkoxide, a metal chelate such as an acetylacetonate, a metal salt of an organic acid, or a metal halide in an alcohol suspension or solution at room temperature, stirring or heating if necessary until a clear solution is obtained and then boiling off the alcohol solvent and the water, alcohol, acetylacetone, halogen acid or organic acid formed by the displacement reaction. The metal sulfonate is then dissolved in a suitable solvent such as xylene, toluene, methyl ethyl ketone or a glycol ether. Alternatively, the metal sulfonate may be prepared in situ by adding the stoichiometric amount of sulfonic acid to a solution of a metal alkoxide, a metal chelate such as an acetylacetonate or a metal salt of an organic acid in one or more of the other components of the curable composition.

In addition to the metal sulfonate, a blocked sulfonic acid catalyst, capable of unblocking at the cure temperature, may be added to the curable composition with the purpose of accelerating the reaction of the amino resin and the co-reactant. Blocking agents include any of the conventional blocking agents which do not influence or interfere with free radical polymerization and include epoxy compounds and oxazolidines and the like. The blocked sulfonic acid is used in a concentration which enhances the rate of reaction of the amino resin and co-reactant at the curing temperature. Advantageously it is used in a concentration to provide from 0.1 to 5 meq. of unblocked acid per 100 parts by weight of the curable composition and is preferably used in a concentration which provides 0.3 to 2 meq of unblocked acid per 100 parts of curable composition. The cure rate enhancing effect of the metal sulfonate can also be augmented by adding metal ligands to the metal sulfonates. Such metal ligands are of the type that can form metal complexes in a wide range of oxidation states and include the α-diimines such as 2,2'-bipyridine and 1,10'-phenanthroline. They are generally used in a concentration in the range of 0.1 to 1 mole per mole of metal sulfonate.

The compositions of the present invention may be used in adhesive and surface coating applications, and in the preparation of prepregs and laminates comprising suitable reinforcing agents such as glass fiber scrim and cloth. Advantageously the compositions may be diluted with solvent to provide suitable coating or impregnation viscosity. The proportions of the curable ingredients of the composition can vary widely depending on the compatibility of the major ingredients and the end use of the cured composition. The major ingredients are advantageously selected to be compatible with one another to avoid impairment of gloss and clarity of the cured compositions. Compatibility is readily determined by mixing the major ingredients and determining the range of mixtures which do not separate into phases or form cloudy solutions or cloudy coatings when the composition is applied as a thin coating to a glass sheet.

Provided that the curable components are suitably compatible, the compositions may comprise any ratio of components that will provide a desired degree of cure or hardness in the cured composition. Advantageously the alkoxymethyl amino resin and functional co-reactant provide at least about 25 weight percent of the curable components of the composition and can provide as much as ninety percent. The ratio of alkoxymethyl amino resin to functional co-reactant is generally in the range of about 1:4 to about 4:1 parts by weight.

In order to accelerate cure of the (meth)acryloyl component of the compositions of the present invention, a free radical initiator may be added. Such free radical initiator is selected to provide an adequate rate of decomposition and free radical generation at the cure temperature of the composition and can be selected from the group consisting of t-butyl hydroperoxide, cumene peroxide, methyl ethyl ketone peroxide, lauroyl peroxide, benzoyl peroxide, 2,5-dihydroperoxy-2,5-dimethylhexane, azo-bis (isobutyronitrile) and the like. Advantageously the concentration of free-radical generating compound is selected within the range of 0.1 to 5 parts by weight of the component reactants and preferably within the range of 0.3 to 3 parts for 100 parts by weight of the component reactants.

Depending on the end use and the application requirements it may be convenient to add any of the other conventional additives for curable compositions such as pigments, fillers, reinforcing agents, stabilizers, inhibitors and flow control agents.

In those cases where it may be desirable to provide solvent (or vehicle) for the curable composition of this invention, such solvent is preferably a volatile organic compound comprising a ketone, such as acetone, methyl ethyl ketone, methyl isobutyl ketone, etc.; an ester such as ethylene glycol monoethyl ether acetate; an aromatic such as toluene, xylene; or a mixture thereof.

It can be advantageous to incorporate the (meth)acryloyl functionality into the functional co-reactant or into the alkoxymethyl amino resin with the purpose of obtaining a wider range of compatibility of the ingredients of the curable composition of the present invention.

In this regard some or all of the functional co-reactant and some or all of the (meth)-acryloyl component can be replaced with a functional (meth)-acryloyl component. Included among such functional (meth)-acryloyl components are hydroxy functional (meth)-acryloyl components such as trimethylolpropane di(meth)-acrylate, pentaerythritol di(meth)-acrylate, pentaerythritol tri(meth)-acrylate, dipentaerythritol (meth)-acrylates containing from 1 to 5 (meth)-acrylate groups, hydroxyethyl (meth)acrylate, the reaction products of (meth)-acrylic acid or (meth)-acrylamide with polyepoxides, and the products obtained by partial esterification of hydroxy functional poly(meth)-acrylates and polyesters with (meth)-acrylic acid. Also included among such functional (meth)acryloyl components are carboxy functional (meth)-acryloyl components such as the products obtained by partial esterification of carboxy functional poly(meth)-acrylates and polyesters with hydroxyalkyl (meth)-acrylates such as hydroxyethyl (meth)-acrylates. Also included are (meth)-acryloyl components containing active methylene groups such as the products of trans-esterification of hydroxy functional (meth)-acryloyl compounds with ethylacetoacetate. Further in this regard, some or all of the (meth)acryloyl component and some or all of the alkoxymethyl amino resin may be replaced with a (meth)-acryloyl functional alkoxymethyl amino resin. Included among such (meth)-acryloyl functional alkoxymethyl amino resins are the reaction products of (meth)-acrylic acid, (meth)-acrylamide or hydroxyalkyl (meth)-acrylates such as hyroxyethyl (meth)-acrylate with the alkoxymethyl amino resins described hereinabove, to provide (meth)-acryloyl functional alkoxymethyl amino resins comprising at least one (meth)-acryloyl group and at least one alkoxymethyl group per average molecule.

In general the ratio of reactants selected for the compositions of the present invention is any ratio which provides compositions capable of being cured to a desired degree of hardness. A satisfactory level of hardness for a coating is a Knoop hardness rating of at least 4 and more preferably a rating of at least 6. Suitable compositions may contain per 100 parts by weight of the reactants present in the composition from about 0.03 to about 0.22 equivalents of functional groups reactive with alkoxymethyl groups, from about 0.05 to about 0.40 equivalents of alkoxymethyl groups and from about 0.10 to about 0.60 equivalents of (meth)-acryloyl groups, the ratio of functional groups reactive with the alkoxymethyl groups to alkoxymethyl groups being in the range of about 0.25 to about 2.5. Preferred compositions contain per 100 parts by weight of the reactants present in the composition, from about 0.08 to about 0.18 equivalents of functional groups reactive with alkoxymethyl groups, from about 0.08 to about 0.30 equivalents of alkoxymethyl groups and from about 0.30 to about 0.50 equivalents of (meth)-acryloyl groups.

The application of the curable composition of the present invention as a coating to a substrate may be executed by a conventional method. That is, the composition may be applied by brushing, roller coating, spraying with compressed air or with a petroleum solvent of low boiling point or electrostatic spraying.

The composition may be applied as a coating to a variety of materials such as wood, paper, paper board, glass, metal, stone, plastics and cloth.

Practical and presently preferred embodiments of the present invention are shown for illustration in the following Examples wherein parts and percentages are by weight unless otherwise indicated.

EVALUATION OF CURED COMPOSITIONS

Solvent resistance of the cured composition is measured by rubbing the coating with felt tip pen soaked with methyl ethyl ketone and is stated as the number of double rubs which are required to break through the coating.

Gloss is measured at 60° and 20° according to ASTM-D573. Results are given in percent (%) for the two angles.

Tukon hardness is measured according to ASTM-D1474. The values are in Knoop hardness units.

Acid etch resistance is determined with two solutions. Solution A consists of an aqueous solution containing 46.5 percent formic acid, 2.5 percent tannic acid, and 1 percent honey. Solution B consists of an aqueous solution comprising 23.5 percent formic acid, 12 percent tannic acid, 12 percent honey and 0.5 percent albumen. Drops of the solutions are applied to test coatings which are then subjected to a temperature of 60° C. for 30 minutes. The coatings are then graded in acid etch resistance according to the following scale:

5—no change,
4—slight discoloration,
3—softening, slight staining,
2—softening, pronounced staining,
1—pronounced softening and staining,
0—coating failure.

EXAMPLE 1

A curable composition is prepared by mixing 24 parts by weight of a hydroxy functional acrylate oligomer of number average molecular weight 1300 and hydroxyl number 140, sold by Johnson and Johnson, Inc., under the tradename Joncryl® 500 as an 80 weight percent solution in methyl n-amyl ketone, 16 parts by weight of an alkoxymethyl melamine (DP=1.4, M:F:Me:Bu, 1.0:5.6:2.8:2.1), 20 parts by weight of Sartomer 399 dipentaerythritol penta-acrylate (DPPA) sold by Sartomer Corporation, 20 parts by weight of an acryloyl oligomer of number average molecular weight 508 and acryloyl functionality of 2, sold by Sartomer Corporation under the tradename Sartomer SR-344, 2 parts by weight of a solution of the dodecylbenzene sulfonate of manganese containing 0.6 weight percent manganese and 1 mole 2,2'-bipyridyl per mole of manganese dodecylbenzene sulfonate, 1.6 parts of an epoxy blocked dodecylbenzene sulfonic acid solution containing 20 weight percent acid, and 10 parts by weight of xylene. The xylene solution of the curable composition shows little change in viscosity after three weeks at room temperature. The solution is coated on a metal panel to provide a dry film thickness of 50 micron. The coating is cured at 120° C. for 30 minutes and is found to possess a Tukon hardness of 11.1, a solvent resistance of greater than 100, and a gloss value after 1000 hours QUV exposure of 79/53. The curable composition is stable in viscosity upon 3 weeks of storage at ambient temperature and upon 1 week of storage at 60° C.

EXAMPLE 2

Example 1 is repeated with Sartomer 344 replaced with an acryloyl oligomer of number average molecular weight 540 and acryloyl functionality of 2, sold by Nippon Kayoko KK under the tradename Kayrad HX-220. The cured coating possesses a Tukon hardness of 6.2, a solvent resistance of greater than 100 and a gloss value after 1000 hours QUV exposure of 90/76.

the hybrid system in comparison with the alkoxymethyl amino/hydroxy reactant components without the (meth)-acryloyl components.

TABLE 1

| | | | Cured Coating Properties | | | | | | |
|---|---|---|---|---|---|---|---|---|---|
| Ex. | Hydroxy Func. Poly-acrylate | Butoxy Methoxy Methyl Melamine | DPPA | Kayrad HX-220 | Xylene | Tukon Hardness | Solv. Resis. | Gloss QUV 1000 hrs. | Acid Etch Resis. A/B |
| 9 | 24 | 16 | 10 | 30 | 6 | 2.0 | >100 | 84/58 | 0/0 |
| 10 | 24 | 16 | 30 | 10 | 15 | 11.5 | >100 | 83/61 | 4/4 |
| 11 | 12 | 8 | 30 | 30 | 10 | 6.5 | >100 | 84/69 | 2/2 |
| 12 | 36 | 24 | 10 | 10 | 20 | 3.0 | >100 | 44/19 | 0/0 |
| 13 | 32 | 8 | 20 | 20 | 15 | 7.8 | >100 | 87/71 | 0/0 |
| 14 | 16 | 24 | 20 | 20 | 10 | 2.9 | >100 | 74/48 | 0/0 |
| C1 | 24 | 16 | — | — | 10 | 8.1 | >100 | 37/14 | 0/3 |
| C2 | — | — | 20 | 20 | — | 0 | 0 | — | — |

EXAMPLE 3

Example 1 is repeated with 1.1 parts of a 28.6% acid solution of oxazolidone blocked dodecylbenzene sulfonic acid in place of the epoxy blocked dodecylbenzene sulfonic acid and with 150 ppm vanadium based on total resin solids added as vanadium octoate in place of the manganese sulfonate. The solution shows little change in viscosity after three weeks at room temperature. The Tukon hardness of the cured coating is 11.0, and the solvent resistance is greater than 100.

EXAMPLE 4

Example 3 is repeated with a methoxymethyl melamine of low degree of methylation (D.P.=1.8, M:F:Me, 1:3.6:2.6). The Tukon hardness of the cured coating is 11.9 and the solvent resistance is greater than 100.

EXAMPLE 5

Example 3 is repeated with a mixed butoxymethoxymethyl melamine (D.P.=2.1, M:F:Me:Bu, 1:5.1:2.2:2.0. The Tukon hardness of the cured coating is 14.8 and the solvent resistance is greater than 100.

EXAMPLES 6-8

Examples 3-5 are repeated with cure effected at 100° C. for 30 minutes. The respective Tukon hardnesses are 6.6, 0, and 6.9. The solvent resistance of example 7 is 38 and the solvent resistances of examples 6 and 8 are greater than 100.

EXAMPLES 9-14, C1, C2

A series of examples with the reactant components of Example 2 is carried out with variation in the amounts of the several components. To each curable composition, 1 part by weight of flow control agent FC-430, sold by Minnesota Mining and Manufacturing Company, was added per 80 parts by weight of reactant solids. The blocked acid catalyst concentration is selected to provide 0.8 parts by weight of dodecylbenzene sulfonic acid per 100 parts of the combined weight of hydroxy functional acrylate oligomer and alkoxymethyl melamine and the manganese sulfonate concentration is selected to provide 0.03 parts of manganese per 100 parts of the acryloyl component. For comparison an example without the (meth)-acryloyl component and an example of (meth)acryloyl components without alkoxymethyl amino resin and hydroxy functional reactant are run. The data are presented in Table 1. They show lack of cure of the (meth)-acryloyl components without the alkoxymethyl amino/hydroxy reactant components and the superior gloss retention of

What is claimed is:

1. A curable composition comprising an alkoxymethyl amino resin component, a hydroxy-functional component co-reactive with the alkoxymethyl amino resin, a (meth)-acryloyl component and a metal sulfonate of a metal selected from Groups IB, IIIB, IVB, VB, VIB, VIIB, and VIII of the CAS version of the Periodic Table.

2. The composition of claim 1 wherein per 100 parts by weight of the components, the concentration of alkoxymethyl groups is in the range of about 0.05 to about 0.40 equivalents, the concentration of functional groups reactive with the alkoxymethyl groups is in the range of about 0.03 to about 0.22 equivalents, the concentration of (meth)-acryloyl groups is in the range of about 0.25 to about 0.60 equivalents, the ratio of functional groups reactive with alkoxymethylamino groups to alkoxymethylamino groups is in the range of about 0.25 to about 2.5, and wherein the alkoxymethyl amino resin and the functional co-reactant provide from about 25 to about 90 parts by weight.

3. The composition of claim 1 wherein the metal is selected from the group consisting of vanadium, manganese, cobalt, nickel and niobium.

4. The composition of claim 1 wherein the metal is selected from the group consisting of vanadium, manganese and niobium.

5. The composition of claim 1 wherein the metal sulfonate is the salt of a sulfonic acid containing $C_6$ to $C_{12}$ aliphatic radicals.

6. The composition of claim 1 wherein the metal sulfonate is the salt of a sulfonic acid selected from the group consisting of hexanesulfonic acid, dodecanesulfonic acid, hexylbenzenesulfonic acid, dodecylbenzenesulfonic acid, dodecylnaphthalenesulfonic acid, dinonylnaphthalenesulfonic acid and dinonylnaphthalene disulfonic acid.

7. The composition of claim 1 additionally comprising a blocked sulfonic acid catalyst.

8. The composition of claim 1 additionally comprising a ligand for the metal ion of the metal sulfonate, of the type that can form metal complexes of various oxidation states of the metal ion.

9. The composition of claim 8 wherein the ligand is 2,2'-bipyridine or 1,10-phenanthroline.

10. The composition of claim 1 additionally comprising a free-radical generating compound.

11. The composition of claim 10 wherein the free-radical generating compound is selected from the group consisting of t-butyl hydroperoxide, cumene hydroperoxide, cumene peroxide, methyl ethyl ketone peroxide, lauroyl peroxide, benzoyl peroxide, 2,5-dihydroperoxy-2,5-dimethylhexane and azo-bis (isobutyronitrile).

12. The composition of claim 2 wherein the (meth)-acryloyl composition is represented by the formula:

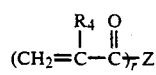

where $R_4$ is selected from the group consisting of H, $CH_3$ and $C_2H_5$ where r is an integer in the range of 1 to 10 and Z is a saturated or ethylenically unsaturated residue of an alcohol, a polyol, a carboxylic acid, a poly-carboxylic acid, an amine, a polyamine, an aminotriazine, an epoxide, a polyepoxide, an isocyanate or a polyisocyanate of a number average molecular weight less than about 4000 containing a hydrocarbon, ester, amide, ether, urethane or triazine nucleus, and wherein the metal of the metal sulfonate is selected from the group consisting of vanadium, manganese, cobalt, nickel, copper and niobium, and is present in a heat-activatable catalytically effective amount to effect cure of the composition.

13. The composition of claim 12 wherein the metal is selected from the group consisting of vanadium, manganese and niobium and the metal sulfonate is the salt of a sulfonic acid containing $C_6$ to $C_{12}$ aliphatic radicals.

14. The composition of claim 12 additionally comprising a blocked sulfonic acid catalyst present in a heat-activatable cure-rate-enhancing amount.

15. The composition of claim 12 additionally comprising a ligand for the metal ion of the metal sulfonate, of the type that can form metal complexes of various oxidation states of the metal ion.

16. The composition of claim 12 additionally comprising a free-radical generating compound.

17. The composition of claim 12 wherein the alkoxymethyl amino resin is an alkoxy-methyl urea or an alkoxymethyl aminotriazine of average degree of condensation of about 5 or less, containing at least 1.8 alkoxymethyl groups per molecule, derived from a urea, or an aminotriazine, formaldehyde and a C1 to C8 alcohol wherein the urea: formaldehyde: alcohol ratio is from about 1:1.5:1.25 to 1:4:4 and wherein the aminotriazine:formaldehyde: alcohol ratio is from about 1:2n-3:2n-3.5 to 1:2n:2n where n is the number of amino groups per triazine ring, and wherein the functional co-reactant is a poly-functional resin of number average molecular weight in the range of from about 300 to about 4000 selected from the group consisting of poly(meth)acrylates, alkyds and polyesters.

18. The curable composition of claim 17 wherein the alkoxymethyl amino resin is an alkoxymethyl melamine.

19. The composition of claim 12 wherein r is in the range of 2 to 6.

20. The curable composition of claim 18 wherein the alkoxymethyl groups are selected from the group consisting of methoxymethyl, butoxymethyl and iso-butoxymethyl.

* * * * *